United States Patent
Coconu et al.

(10) Patent No.: US 12,429,953 B2
(45) Date of Patent: Sep. 30, 2025

(54) MULTI-SoC HAND-TRACKING PLATFORM

(71) Applicant: Snap Inc., Santa Monica, CA (US)

(72) Inventors: Liviu Marius Coconu, Vienna (AT); Daniel Colascione, Melbourne Beach, FL (US); Farid Zare Seisan, San Diego, CA (US); Daniel Harris, San Francisco, CA (US); Jennica Pounds, Cape Coral, FL (US)

(73) Assignee: SNAP INC., Santa Monica, CA (US)

( * ) Notice: Subject to any disclaimer, the term of this patent is extended or adjusted under 35 U.S.C. 154(b) by 219 days.

(21) Appl. No.: 18/078,547

(22) Filed: Dec. 9, 2022

(65) Prior Publication Data
US 2024/0192780 A1 Jun. 13, 2024

(51) Int. Cl.
| | | |
|---|---|---|
| *G06F 3/01* | (2006.01) | |
| *G06T 11/00* | (2006.01) | |
| *G06V 10/764* | (2022.01) | |
| *G06V 10/94* | (2022.01) | |
| *G06V 20/20* | (2022.01) | |
| *G06V 40/20* | (2022.01) | |

(52) U.S. Cl.
CPC .............. *G06F 3/017* (2013.01); *G06F 3/011* (2013.01); *G06T 11/00* (2013.01); *G06V 10/764* (2022.01); *G06V 10/955* (2022.01); *G06V 20/20* (2022.01); *G06V 40/28* (2022.01)

(58) Field of Classification Search
None
See application file for complete search history.

(56) References Cited

U.S. PATENT DOCUMENTS

| | | | |
|---|---|---|---|
| 5,604,843 | A | 2/1997 | Shaw et al. |
| 5,689,559 | A | 11/1997 | Park |
| 5,880,731 | A | 3/1999 | Liles et al. |
| 6,023,270 | A | 2/2000 | Brush, II et al. |
| RE36,919 | E | 10/2000 | Park |
| RE37,052 | E | 2/2001 | Park |

(Continued)

FOREIGN PATENT DOCUMENTS

| | | |
|---|---|---|
| CN | 103049761 | 8/2016 |
| CN | 109863532 A | 6/2019 |

(Continued)

OTHER PUBLICATIONS

"International Application Serial No. PCT/US2023/016813, Invitation to Pay Additional Fees mailed Jul. 13, 2023", 12 pgs.

(Continued)

*Primary Examiner* — Anh-Tuan V Nguyen
(74) *Attorney, Agent, or Firm* — SCHWEGMAN LUNDBERG & WOESSNER, P.A.

(57) ABSTRACT

A multi-System on Chip (SoC) hand-tracking platform is provided. The multi-SoC hand-tracking platform includes a computer vision SoC and one or more application SoCs. The computer vision SoC hosts a hand-tracking input pipeline. The one or more application SoCs host one or more applications that are consumers of input event data generated by the hand-tracking input pipeline. The applications communicate with some components of the hand-tracking input pipeline using a shared-memory buffer and with some of the components of the hand-tracking input pipeline using Inter-Process Communication (IPC) method calls.

21 Claims, 10 Drawing Sheets

(56) References Cited

U.S. PATENT DOCUMENTS

| | | |
|---|---|---|
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,177,930 B1 * | 2/2007 | LoPresti ............... H04L 41/142 709/224 |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 7,971,156 B2 | 6/2011 | Albertson et al. |
| 7,996,793 B2 | 8/2011 | Latta et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,487,938 B2 | 7/2013 | Latta et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,691 B2 | 10/2014 | Geisner et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,225,897 B1 | 12/2015 | Sehn et al. |
| 9,230,160 B1 | 1/2016 | Kanter |
| 9,241,184 B2 | 1/2016 | Weerasinghe |
| 9,256,860 B2 | 2/2016 | Herger et al. |
| 9,276,886 B1 | 3/2016 | Samaranayake |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,284,508 B1 | 5/2019 | Allen et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,439,972 B1 | 10/2019 | Spiegel et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,509,466 B1 | 12/2019 | Miller et al. |
| 10,514,876 B2 | 12/2019 | Sehn |
| 10,573,048 B2 | 2/2020 | Ni et al. |
| 10,579,869 B1 | 3/2020 | Xiong et al. |
| 10,614,855 B2 | 4/2020 | Huang |
| 10,656,797 B1 | 5/2020 | Alvi et al. |
| 10,657,695 B2 | 5/2020 | Chand et al. |
| 10,657,701 B2 | 5/2020 | Osman et al. |
| 10,748,347 B1 | 8/2020 | Li et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,958,608 B1 | 3/2021 | Allen et al. |
| 10,962,809 B1 | 3/2021 | Castañeda |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 10,996,846 B2 | 5/2021 | Robertson et al. |
| 10,997,787 B2 | 5/2021 | Ge et al. |
| 11,010,022 B2 | 5/2021 | Alvi et al. |
| 11,012,390 B1 | 5/2021 | Al Majid et al. |
| 11,030,454 B1 | 6/2021 | Xiong et al. |
| 11,030,789 B2 | 6/2021 | Chand et al. |
| 11,036,368 B1 | 6/2021 | Al Majid et al. |
| 11,036,781 B1 | 6/2021 | Baril et al. |
| 11,062,498 B1 | 7/2021 | Voss et al. |
| 11,063,891 B2 | 7/2021 | Voss |
| 11,069,103 B1 | 7/2021 | Blackstock et al. |

(56) References Cited

U.S. PATENT DOCUMENTS

| | | |
|---|---|---|
| 11,080,917 B2 | 8/2021 | Monroy-hernández et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,128,586 B2 | 9/2021 | Al Majid et al. |
| 11,143,867 B2 | 10/2021 | Rodriguez, II |
| 11,150,800 B1* | 10/2021 | Longest ............... G06F 3/0233 |
| 11,169,600 B1 | 11/2021 | Canberk et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,227,626 B1 | 1/2022 | Krishnan Gorumkonda et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,307,747 B2 | 4/2022 | Dancie et al. |
| 11,531,402 B1 | 12/2022 | Stolzenberg |
| 11,546,505 B2 | 1/2023 | Canberk |
| 11,567,324 B2 | 1/2023 | Kimmel |
| 11,734,795 B2 | 8/2023 | Su et al. |
| 12,148,105 B2 | 11/2024 | Aitbayev et al. |
| 12,254,577 B2 | 3/2025 | Aitbayev et al. |
| 2002/0067362 A1 | 6/2002 | Agostino Nocera et al. |
| 2002/0169644 A1 | 11/2002 | Greene |
| 2004/0027374 A1* | 2/2004 | Cirne .................. G06F 9/542 |
| | | 715/744 |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0012788 A1 | 1/2009 | Gilbert et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0301934 A1 | 12/2011 | Tardif |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0110745 A1* | 5/2013 | Zhang .................. G06N 5/025 |
| | | 706/12 |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0171036 A1 | 6/2014 | Simmons |
| 2015/0120293 A1 | 4/2015 | Wohlert et al. |
| 2015/0206349 A1 | 7/2015 | Rosenthal et al. |
| 2015/0243035 A1 | 8/2015 | Narasimha et al. |
| 2015/0370320 A1 | 12/2015 | Connor |
| 2016/0080173 A1* | 3/2016 | Quick ............... G06Q 30/0202 |
| | | 705/7.31 |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0123487 A1 | 5/2017 | Hazra et al. |
| 2017/0193334 A1* | 7/2017 | Krupka ............... G06V 10/764 |
| 2017/0199855 A1 | 7/2017 | Fishbeck |
| 2017/0235848 A1 | 8/2017 | Van Dusen et al. |
| 2017/0277684 A1 | 9/2017 | Dharmarajan Mary |
| 2017/0277685 A1 | 9/2017 | Takumi |
| 2017/0310934 A1 | 10/2017 | Du et al. |
| 2017/0312634 A1 | 11/2017 | Ledoux et al. |
| 2017/0351910 A1 | 12/2017 | Elwazer et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0158370 A1 | 6/2018 | Pryor |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057515 A1 | 2/2019 | Teixeira et al. |
| 2019/0057616 A1 | 2/2019 | Cohen et al. |
| 2019/0097958 A1 | 3/2019 | Collet et al. |
| 2019/0116322 A1 | 4/2019 | Holzer et al. |
| 2019/0180494 A1* | 6/2019 | Kuwahara ............ G06T 15/005 |
| 2019/0188920 A1 | 6/2019 | Mcphee et al. |
| 2019/0251340 A1* | 8/2019 | Brown .................. G06N 3/045 |
| 2019/0280997 A1 | 9/2019 | Baldwin et al. |
| 2020/0306637 A1 | 10/2020 | Baldwin et al. |
| 2020/0372127 A1 | 11/2020 | Denton et al. |
| 2020/0410575 A1 | 12/2020 | Grantham et al. |
| 2021/0011612 A1 | 1/2021 | Dancie et al. |
| 2021/0065448 A1 | 3/2021 | Goodrich et al. |
| 2021/0074016 A1 | 3/2021 | Li et al. |
| 2021/0074047 A1 | 3/2021 | Sheth et al. |
| 2021/0089179 A1 | 3/2021 | Grantham et al. |
| 2021/0089475 A1* | 3/2021 | Mathur ............... G06F 13/1642 |
| 2021/0104087 A1 | 4/2021 | Smith et al. |
| 2021/0166732 A1 | 6/2021 | Shaburova et al. |
| 2021/0168108 A1 | 6/2021 | Antmen et al. |
| 2021/0170270 A1 | 6/2021 | Brody et al. |
| 2021/0174034 A1 | 6/2021 | Retek et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0241529 A1 | 8/2021 | Cowburn et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0306290 A1 | 9/2021 | Voss |
| 2021/0306451 A1 | 9/2021 | Heikkinen et al. |
| 2021/0358123 A1 | 11/2021 | Kearney et al. |
| 2021/0358212 A1 | 11/2021 | Vesdapunt et al. |
| 2021/0373672 A1* | 12/2021 | Schwarz ............... G06F 3/017 |
| 2021/0382564 A1 | 12/2021 | Blachly et al. |
| 2021/0385180 A1 | 12/2021 | Al Majid et al. |
| 2021/0397000 A1 | 12/2021 | Rodriguez, II |
| 2021/0397266 A1* | 12/2021 | Gupta .................. G06N 20/10 |
| 2021/0405761 A1 | 12/2021 | Canberk |
| 2021/0405831 A1 | 12/2021 | Mourkogiannis et al. |
| 2021/0409535 A1 | 12/2021 | Mourkogiannis et al. |
| 2022/0009513 A1* | 1/2022 | Yoon .................. B60W 50/10 |
| 2022/0012929 A1 | 1/2022 | Blackstock et al. |

(56) References Cited

U.S. PATENT DOCUMENTS

| | | | |
|---|---|---|---|
| 2022/0188539 | A1 | 6/2022 | Chan et al. |
| 2022/0206588 | A1 | 6/2022 | Canberk et al. |
| 2022/0292699 | A1 | 9/2022 | Zhu et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |
| 2023/0316665 | A1 | 10/2023 | Aitbayev et al. |
| 2023/0316666 | A1 | 10/2023 | Aitbayev et al. |
| 2024/0404220 | A1 | 12/2024 | Aitbayev et al. |

FOREIGN PATENT DOCUMENTS

| | | | |
|---|---|---|---|
| CN | 110168478 | A | 8/2019 |
| CN | 118974778 | A | 11/2024 |
| CN | 119013697 | A | 11/2024 |
| EP | 2184092 | A2 | 5/2010 |
| EP | 3707693 | | 9/2020 |
| JP | 2001230801 | A | 8/2001 |
| JP | 5497931 | B2 | 3/2014 |
| KR | 101445263 | B1 | 9/2014 |
| KR | 20220158824 | | 12/2022 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | 2016168591 | | 10/2016 |
| WO | WO-2018081013 | A1 | 5/2018 |
| WO | WO-2018102562 | A1 | 6/2018 |
| WO | WO-2018129531 | A1 | 7/2018 |
| WO | 2019094618 | | 5/2019 |
| WO | WO-2019089613 | A1 | 5/2019 |
| WO | WO-2020171907 | A1 | 8/2020 |
| WO | 2022005687 | | 1/2022 |
| WO | 2022005693 | | 1/2022 |
| WO | 2022060549 | | 3/2022 |
| WO | 2022066578 | | 3/2022 |
| WO | 2022132381 | | 6/2022 |
| WO | 2022146678 | | 7/2022 |
| WO | 2022198182 | | 9/2022 |
| WO | 2022216784 | | 10/2022 |
| WO | 2022225761 | | 10/2022 |
| WO | 2022245765 | | 11/2022 |
| WO | 2023192426 | | 10/2023 |
| WO | 2023196387 | | 10/2023 |
| WO | WO-2024123693 | A1 | 6/2024 |

OTHER PUBLICATIONS

"International Application Serial No. PCT/US2023/017550, International Search Report mailed Aug. 3, 2023", 4 pgs.
"International Application Serial No. PCT/US2023/017550, Written Opinion mailed Aug. 3, 2023", 10 pgs.
"International Application Serial No. PCT/US2023/016813, International Search Report mailed Sep. 4, 2023", 7 pgs.
"International Application Serial No. PCT/US2023/016813, Written Opinion mailed Sep. 4, 2023", 11 pgs.
Chen, Weifeng, "Surface Normals in the Wild", arxiv.org, Cornell University Library, 201 Olin Library Cornell University Ithaca, NY, 14853, (Apr. 10, 2017), 12 pgs.
Jafarian, Yasamin, "Learning High Fidelity Depths of Dressed Humans by Watching Social Media Dance Videos", IEEE CVF Conference on Computer Vision and Pattern Recognition (CVPR), IEEE, (Jun. 20, 2021), 10 pgs.
Pandey, Rohit, "Total relighting", ACM Transactions on Graphics, ACM, NY, US, vol. 40, No. 4, (Jul. 19, 2021), 1-21.
Trigeorgis, George, "Face Normals "In-the-Wild" Using Fully Convolutional Networks", IEEE Conference on Computer Vision and Pattern Recognition (CVPR), IEEE Computer Society, US, (Jul. 21, 2017), 10 pgs.
Wong, Hallee, "Markerless Augmented Advertising for Sports Videos", Advances in Databases and Information Systems; [Lecture Notes in Computer Science; Lect.Notes Computer], Springer International Publishing, CHAM, XP047512803, (Jun. 19, 2019), 494-509.
Zhen, Jianan, "SMAP: Single-Shot Multi-Person Absolute 3D Pose Estimation", arxiv.org, Cornell University Library, 201 Olin Library Cornell University Ithaca, NY, 14853, XP081748775, (Aug. 26, 2020), 20 pgs.
"U.S. Appl. No. 17/841,994, Corrected Notice of Allowability mailed Oct. 16, 2024", 6 pgs.
"U.S. Appl. No. 17/841,994, Notice of Allowance mailed Jan. 23, 2024", 11 pgs.
"U.S. Appl. No. 17/841,994, Notice of Allowance mailed May 10, 2024", 9 pgs.
"U.S. Appl. No. 17/842,006, Examiner Interview Summary mailed Oct. 1, 2024", 3 pgs.
"U.S. Appl. No. 17/842,006, Final Office Action mailed Sep. 3, 2024", 36 pgs.
"U.S. Appl. No. 17/842,006, Non Final Office Action mailed Mar. 21, 2024", 33 pgs.
"U.S. Appl. No. 17/842,006, Notice of Allowance mailed Nov. 20, 2024", 15 pgs.
"U.S. Appl. No. 17/842,006, Response filed Jun. 11, 2024 to Non Final Office Action mailed Mar. 21, 2024", 10 pgs.
"U.S. Appl. No. 17/842,006, Response filed Oct. 7, 2024 to Final Office Action mailed Sep. 3, 2024", 10 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-US/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/ho/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"International Application Serial No. PCT/US2023/016813, International Preliminary Report on Patentability mailed Oct. 10, 2024", 13 pgs.
"International Application Serial No. PCT/US2023/017550, International Preliminary Report on Patentability mailed Oct. 17, 2024", 12 pgs.
"International Application Serial No. PCT/US2023/082328, International Search Report mailed Mar. 5, 2024", 3 pgs.
"International Application Serial No. PCT/US2023/082328, Written Opinion mailed Mar. 5, 2024", 7 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: [https://www.businessinsider.com/snap-offers-personalized-video-content-through-bitmoji-tv-2019-12>, (2019), 10 pgs.

(56) References Cited

OTHER PUBLICATIONS

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How to Add Bitmoji to Customizable Geofilters", International Business Times, [Online] Retrieved from the Internet: <URL: https://www.ibtimes.com/snapchat-update-how-add-bitmoji-customizable-geofilters-2448152>, (Nov. 18, 2016), 6 pgs.

\* cited by examiner

MULTI-SoC HAND-TRACKING PLATFORM

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term AR refers to either or both augmented reality and virtual reality as traditionally understood, unless the context indicates otherwise.

A user of the head-worn device may access and use computer software applications to perform various tasks or engage in an entertaining activity. Performing the tasks or engaging in the entertaining activity may require entry of various commands and text into the head-worn device. Therefore, it is desirable to have a mechanism for entering commands and text.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
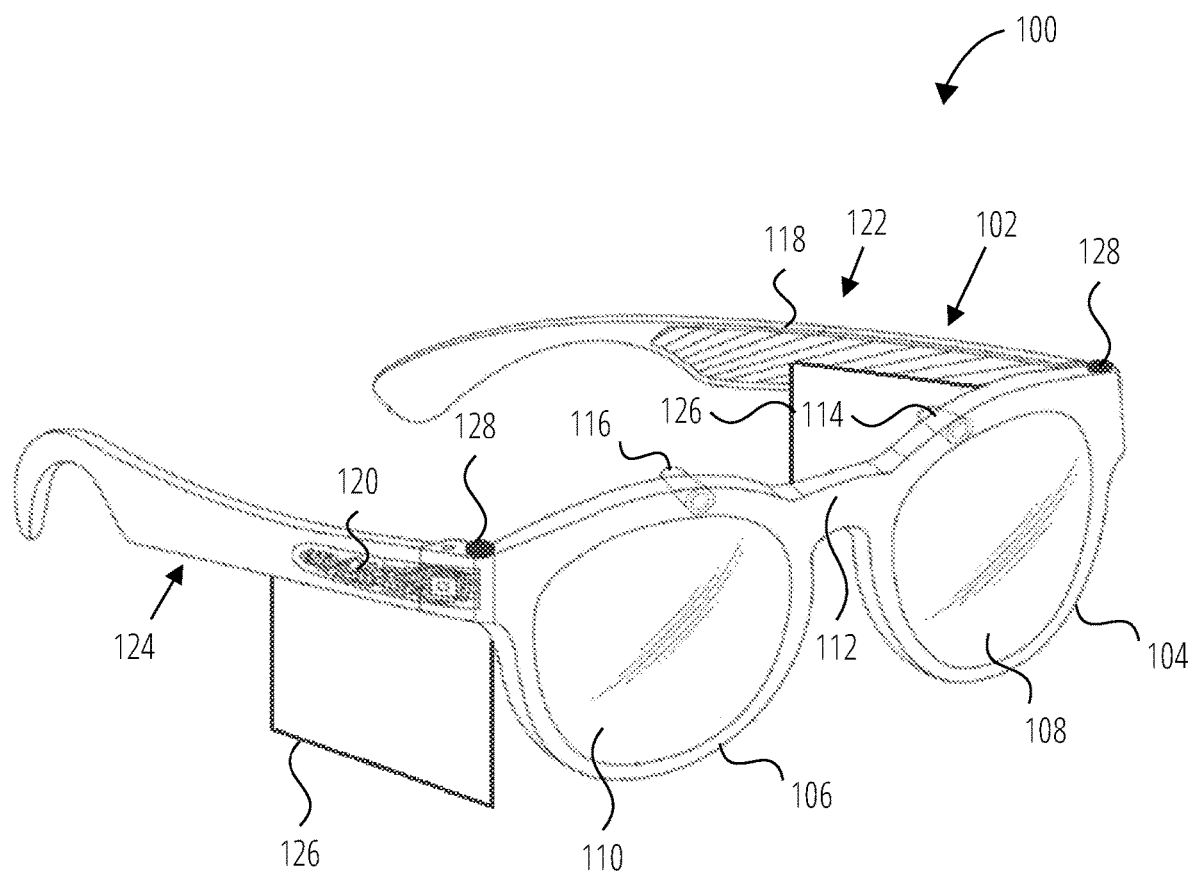
FIG. 1 is a perspective view of a head-worn device, in accordance with some examples.

AR systems are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have input modalities that would allow for a greater range of inputs that could be utilized by a user to indicate their intent through a user input. Computer vision-based hand-tracking provides such input modalities.

A hand-tracking input modality that may be utilized with AR systems is hand-tracking combined with Direct Manipulation of Virtual Objects (DMVO). In DMVO methodologies, a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene environment while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

Gestures that do not involve DMVO provide another hand-tracking input modality suitable for use with AR systems. Gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in space, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene environment through the lenses of the AR system, view an AR overlay on the real-world scene environment view of the machinery, and provide user inputs into the AR system.

On a multi-System on Chip (SoC) system, hand-tracking can be expensive to run on each individual node. In some examples, rather than have each SoC implement a unique instance of a hand-tracking input pipeline, a more power-efficient way to provide hand-tracking data is to process hand-tracking data using a single SoC and share the hand-tracking data as gesture and DMVO data across a cluster of SoCs. Hand-tracking data is published over an Inter-Process Communication (IPC) bridge that is accessible from any SoC. Accordingly, hand-tracking inputs are provided through a minimal-latency, synchronized shared-memory buffer over IPC. In this way, a multiple-SoC setup is treated as an AR cluster rather than having each SoC perform hand-tracking in isolation.

In additional examples, a skeletal model inference component of a hand-tracking input pipeline publishes skeleton samples using shared memory buffers, allowing for reading of processed skeletal model data with low latency. Cross-SoC latency propagation of model updates in this mode may have sub-millisecond latency. AR application components that opt to consume raw skeletal model data instead of gesture input events read from the same skeletal model data shared memory buffer, thus minimizing latency and facilitating operations that want to closely correlate graphics and hand movement observations such as in a DMVO user interface.

Other technical features may be readily apparent to one skilled in the art from the following figures, descriptions, and claims.

FIG. 1 is a perspective view of a head-worn AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the temple piece 122 or the temple piece 124. The computer 120 can include multiple SoC's with processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 802 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
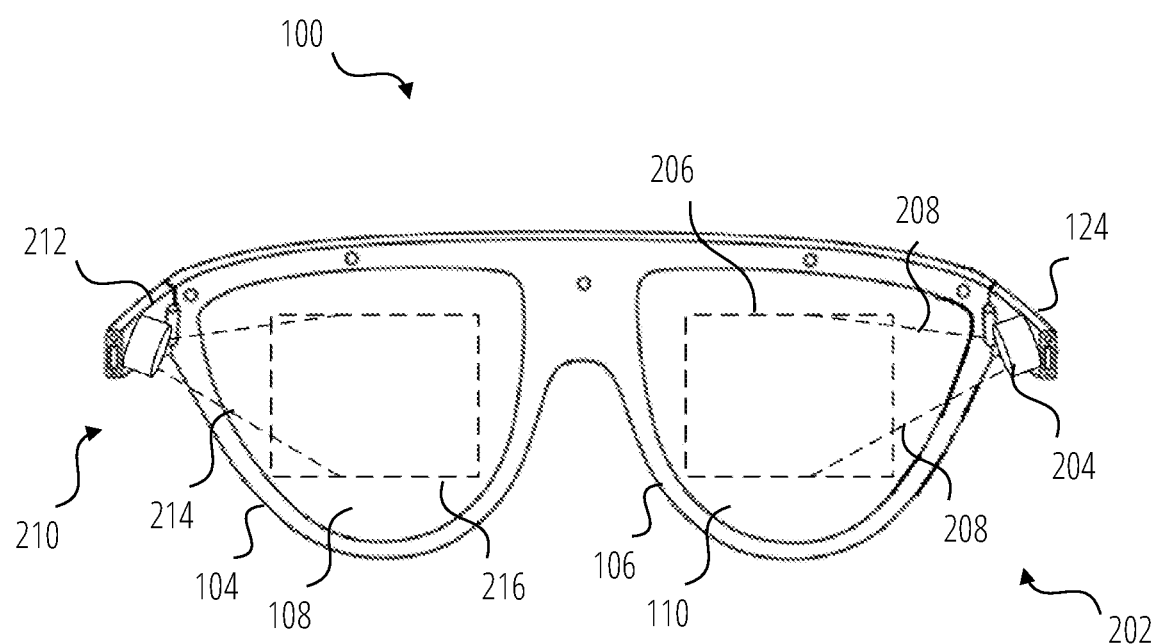
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 826 illustrated in FIG. 8), and/or hand movements, locations, and positions detected by the glasses 100.

Figure 3:
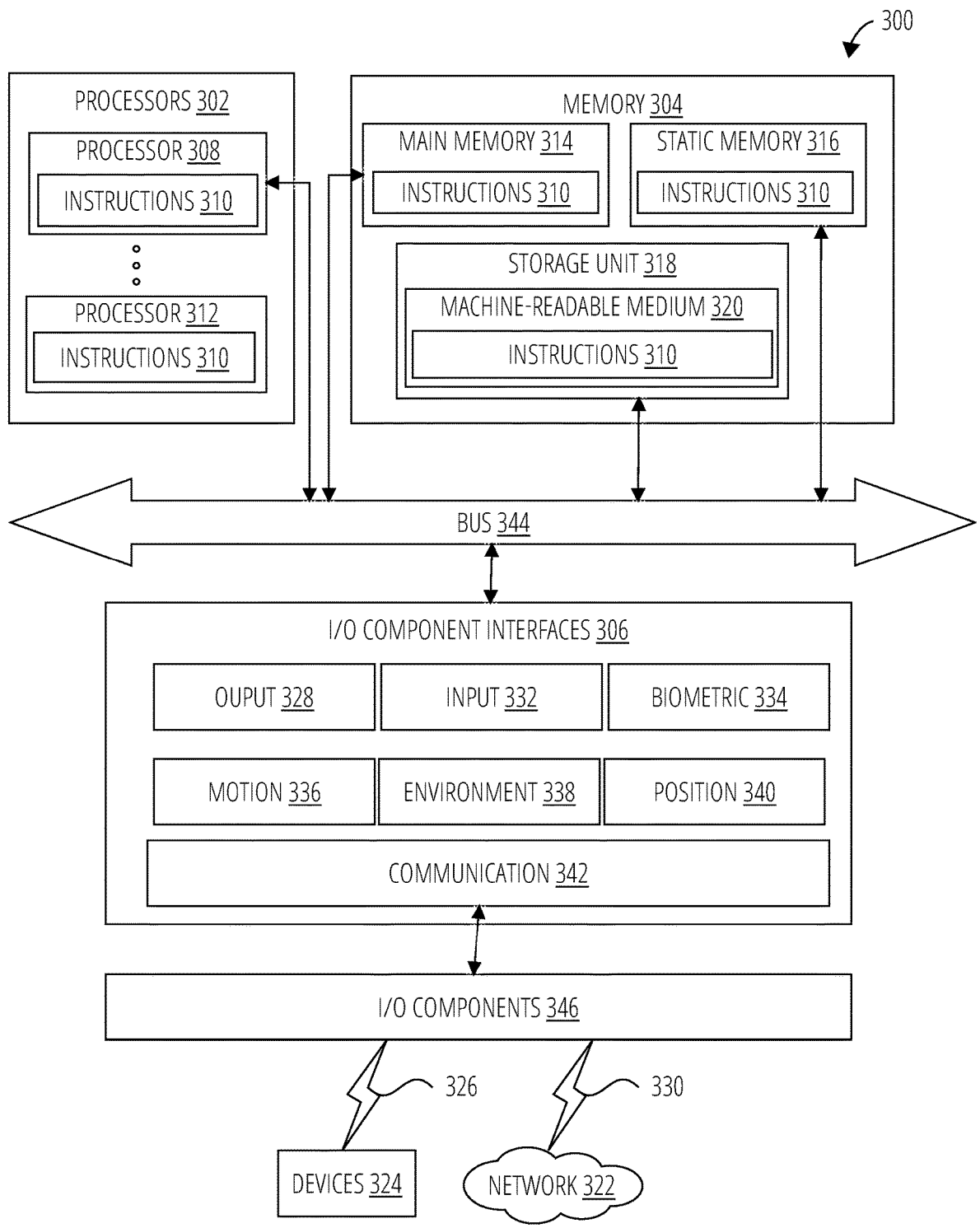
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a component of a multi-SoC platform used as a computer 120 of an AR system such as glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 in conjunction with other components of the AR system may function as, but not is not limited to, a server, a client, computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O component interfaces 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O component interfaces 306 couple the machine 300 to I/O components 346. One or more of the I/O components 346 may be a component of machine 300 or may be separate devices. The I/O component interfaces 306 may include a wide variety of interfaces to the I/O components 346 used by the machine 300 to receive input, provide output, produce output, transmit information, exchange information, capture measurements, and so on. The specific I/O component interfaces 306 that are included in a particular machine will depend on the type of machine. It will be appreciated that the I/O component interfaces 306 the I/O components 346 may include many other components that are not shown in FIG. 3. In various examples, the I/O component interfaces 306 may include output component interfaces 328 and input component interfaces 332. The output component interfaces 328 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 332 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O component interfaces 306 may include biometric component interfaces 334, motion component interfaces 336, environmental component interfaces 338, or position component interfaces 340, among a wide array of other component interfaces. For example, the biometric component interfaces 334 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 336 may include interfaces to inertial measurement units (IMUs), acceleration sensor components (e.g., accelerometer), gravitation sensor components, rotation sensor components (e.g., gyroscope), and so forth. The environmental component interfaces 338 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position component interfaces 340 include interfaces to location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O component interfaces 306 further include communication component interfaces 342 operable to couple the machine 300 to a network 322 or devices 324 via a coupling 330 and a coupling 326, respectively. For example, the communication component interfaces 342 may include an interface to a network interface component or another suitable device to interface with the network 322. In further examples, the communication component interfaces 342 may include interfaces to wired communication components, wireless communication components, cellular communication components, Near Field Communication (NFC) components, Bluetooth© components (e.g., Bluetooth© Low Energy), Wi-Fi© components, and other communication components to provide communication via other modalities. The devices 324 may be another machine or any of a wide variety of peripheral devices (e.g., a peripheral device coupled via a USB).

Moreover, the communication component interfaces 342 may include interfaces to components operable to detect identifiers. For example, the communication component interfaces 342 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication component interfaces 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
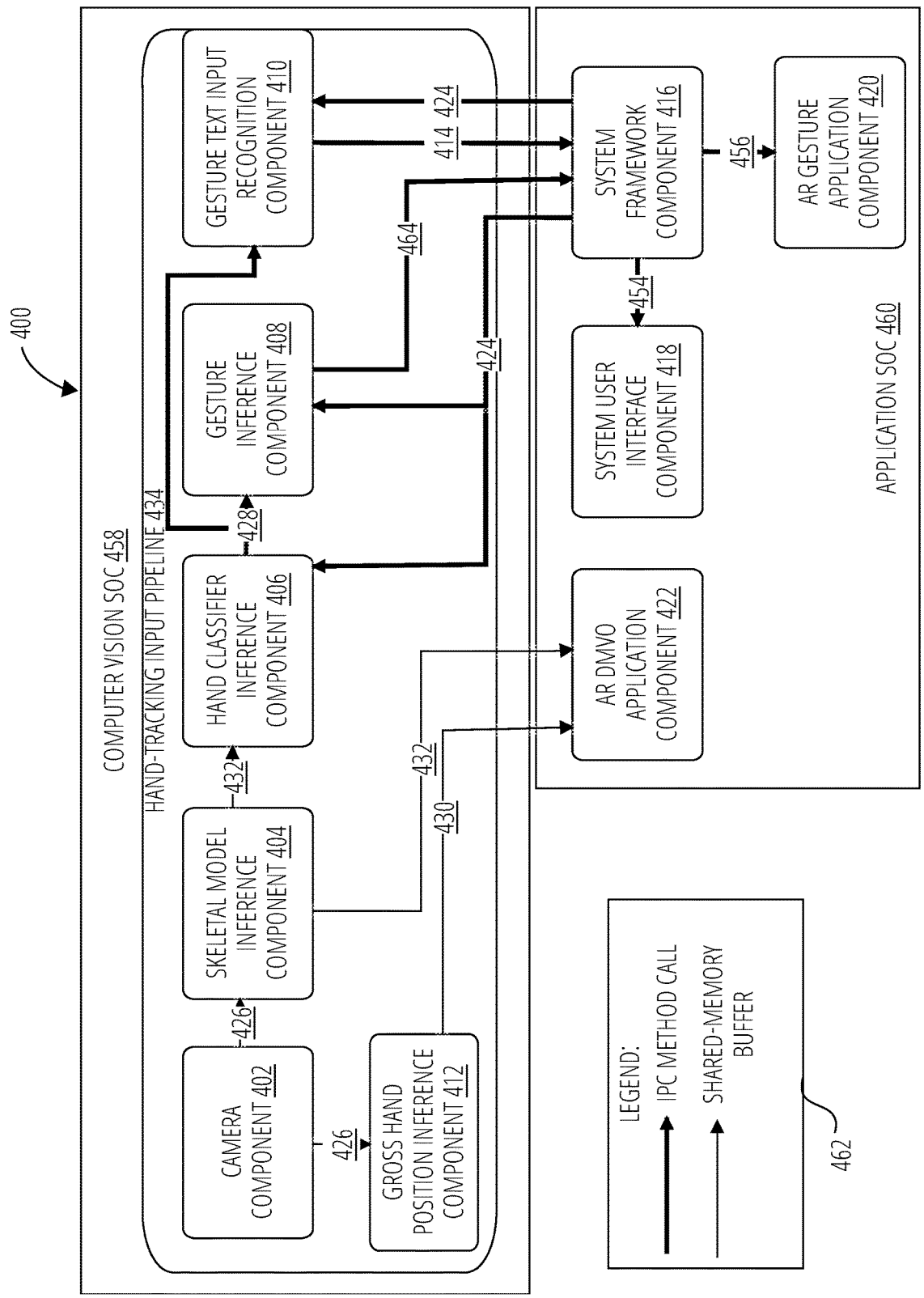
FIG. 4A is collaboration diagram of a multi-SoC platform for an AR system in accordance with some examples.
Figure 4B:
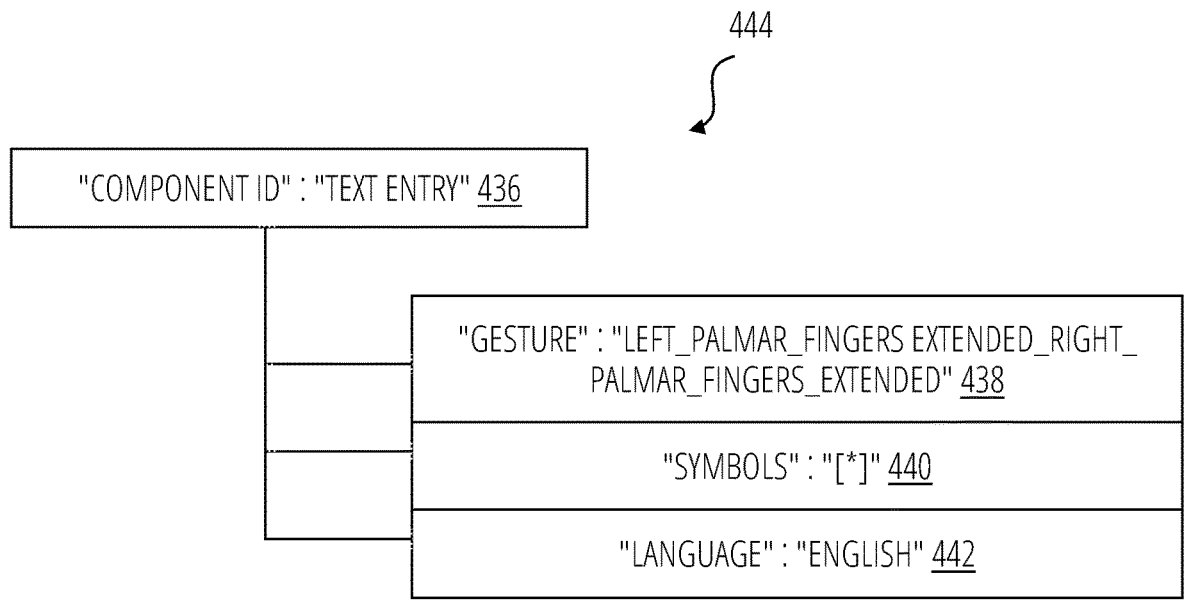
FIG. 4B is an illustration of a data structure in accordance with some examples.
Figure 4C:
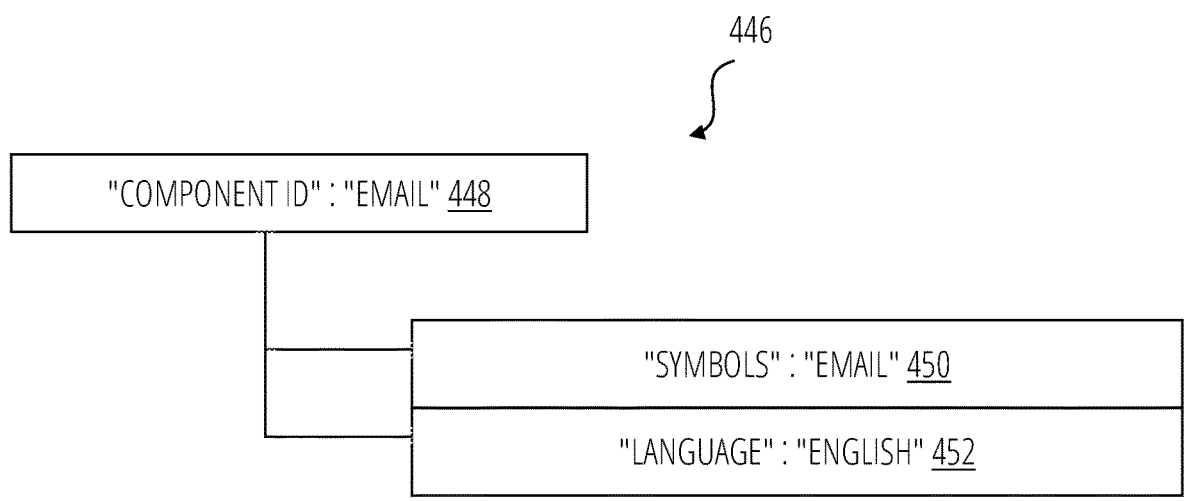
FIG. 4C is an illustration of another data structure in accordance with some examples.

FIG. 4A is collaboration diagram of a multi-SoC hand-tracking platform 400 for an AR system, such as glasses 100, and FIG. 4B and FIG. 4C are illustrations of data structures in accordance with some examples. The multi-SoC hand-tracking platform 400 includes a computer vision SoC 458 that hosts a hand-tracking input pipeline 434 used for processing hand-tracking inputs into the AR system and one or more application SoC 460 that host AR applications that are provided to a user of the AR system. In some examples, an application SoC 460 of the one or more application SoCs functions as a core processing system for the AR system and hosts an operating system of the AR system.

The hand-tracking input pipeline 434 includes a camera component 402 that generates real-world scene environment frame data 426 of a real-world scene environment from a perspective of a user of the AR system using one or more cameras of the AR system, such as cameras 114 and 116 of FIG. 1. The camera component 402 communicates the real-world scene environment frame data 426 to a skeletal model inference component 404. Included in the real-world scene environment frame data 426 are tracking video frame data of detectable portions of the user's body including portions of the user's upper body, arms, hands, and fingers. The tracking video frame data includes video frame data of movement of portions of the user's upper body, arms, and hands as the user makes a gesture or moves their hands and fingers to interact with a real-world scene environment; video frame data of locations of the user's arms and hands in space as the user makes the gesture or moves their hands and fingers to interact with the real-world scene environment; and video frame data of positions in which the user holds their upper body, arms, hands, and fingers as the user makes the gesture or moves their hands and fingers to interact with the real-world scene environment.

The skeletal model inference component 404 scans for, detects, and tracks landmarks on portions of the user's upper body, arms, and hands in the real-world scene environment. In some examples, the skeletal model inference component 404 receives real-world scene environment frame data 426 from the camera component 402 and extracts features of the user's upper body, arms, and hands from the tracking video frame data included in the real-world scene environment frame data 426. The skeletal model inference component 404 generates skeletal model data 432 based on the features extracted from the real-world scene environment frame data 426.

In some examples, the skeletal model inference component 404 generates the skeletal model data 432 on a basis of categorizing the real-world scene environment frame data 426 using artificial intelligence methodologies and a skeletal classifier model previously generated using machine learning methodologies. In some examples, a skeletal classifier model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies may include, but are not limited to, supervised learning, unsupervised learning, semi-supervised learning, reinforcement learning, dimensionality reduction, self-learning, feature learning, sparse dictionary learning, and anomaly detection.

The skeletal model data 432 includes landmark data such as landmark identification, location in the real-world scene environment, and categorization information of one or more landmarks associated with the user's upper body, arms, and hands. The skeletal model inference component 404 communicates the skeletal model data 432 to the hand classifier inference component 406. In addition, the skeletal model inference component 404 makes the skeletal model data 432 available to an application being executed on the AR system, such as AR DMVO application component 422.

The camera component 402 communicates the real-world scene environment frame data 426 to a gross hand position inference component 412. In process 508, the gross hand position inference component 412 generates coordinate transformation data 430 based on the real-world scene environment frame data 426. The coordinate transformation data 430 includes a continuously updated transformation from a coordinate system of a skeletal model of the skeletal model data 432 and a coordinate system of the AR system's user coordinate system. In an example, the gross hand position inference component 412 receives real-world scene environment frame data 426 of a real-world scene environment and extracts features of objects in the real-world scene environment including the user's upper body, arms, and hands from the real-world scene environment video frame data. The gross hand position inference component 412 generates coordinate transformation data 430 based on the extracted features. The gross hand position inference component 412 communicates the coordinate transformation data 430 to the AR DMVO application component 422.

The hand classifier inference component 406 receives the skeletal model data 432 from the skeletal model inference component 404 and generates hand classifier probability data 428 based on the skeletal model data 432. The one or more hand classifier probabilities indicate a probability that a specified hand classifier can be identified from the skeletal model data 432. Gestures are recognized by the hand-tracking input pipeline 434 in terms of combinations of hand classifiers. The hand classifiers are in turn composed of combinations and relationships of landmarks included in the skeletal model data 432. As the hand-tracking input pipeline 434 extracts hand classifiers from the skeletal model data 432 by the hand-tracking input pipeline 434 in a layer distinct from assembly of hand movements into gestures, a designer of the AR system may create new gestures built out of existing hand classifiers composing already known gestures without having to re-train machine learning components of the hand-tracking input pipeline 434.

In some examples, the hand classifier inference component 406 uses geometric methodologies to compare one or more skeletal models included in skeletal model data 432 to previously generated hand classifier models and generates one or more hand classifier probabilities on the basis of the comparison.

In some examples, the hand classifier inference component 406 determines the one or more hand classifier probabilities on a basis of categorizing the skeletal models using artificial intelligence methodologies and a hand classifier model previously generated using machine learning methodologies. In some examples, a hand classifier model comprise, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

The hand classifier inference component 406 communicates the hand classifier probability data 428 to a gesture inference component 408 and a gesture text input recognition component 410.

The gesture inference component 408 receives the hand classifier probability data 428 and generates gesture input event data 464 based on the hand classifier probability data 428. In an example, the gesture inference component 408 compares hand classifiers identified in the hand classifier probability data 428 to gesture identification data identifying specific gestures. A gesture identification is composed of one or more hand classifiers that correspond to a specific gesture. A gesture identification is defined using a grammar whose symbols correspond to hand classifiers. For example, a gesture identification for may be "LEFT_PALMAR_FINGERS EXTENDED_RIGHT PALMAR_FINGERS_EXTENDED" where: "LEFT" is a symbol corresponding to a hand classifier indicating that the user's left hand has been detected; "PALMAR" is a symbol corresponding to a hand classifier indicating that a palm of a hand of the user has been detected and modifies "LEFT" to indicate that the user's left hand palm has been detected; "FINGERS" is a symbol corresponding to a hand classifier indicating that the user's fingers have been detected; and "EXTENDED" is a symbol corresponding to a hand classifier indicating that the user's fingers are extended and modifies "FINGERS". In additional examples, a gesture identification is a single token, such as a number, identifying a gesture based on the gesture's component hand classifiers. A gesture identification identifies a gesture in the context of a physical description of the gesture.

In some examples, the gesture inference component 408 determines gesture input events included in the gesture input event data 464 on a basis of categorizing the hand classifier probability data 428 using artificial intelligence methodologies and one or more gesture models previously generated using machine learning methodologies. In some examples, a gesture model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

In some examples, the gesture inference component 408 determines gesture input events of the gesture input event data 464 on the basis of parsing the hand classifier probability data 428 using a previously determined gesture grammar.

The gesture text input recognition component 410 also receives the hand classifier probability data 428 from the hand classifier inference component 406 and generates symbol input event data 414 based on the hand classifier probability data 428. In an example, the gesture inference component 408 compares hand classifiers identified in the hand classifier probability data 428 to symbol data identifying specific characters, words, and commands. For example, symbol data for a gesture may be the character "V" for a gesture that is a fingerspelling sign in American Sign Language (ASL). The individual hand classifiers for the "V" fingerspelling sign may be "LEFT" for left hand, "PALMAR" for the palm of the left hand, "INDEXFINGER" for the index finger "EXTENDED" modifying "INDEXFINGER", "MIDDLEFINGER" for the middle finger, "EXTENDED" modifying "MIDDLEFINGER", "RINGFINGER" for the ring finger, "CURLED" modifying "RINGFINGER", "LITTLEFINGER" for the little finger, "CURLED" modifying "LITTLEFINGER", "THUMB" for the thumb and "CURLED" modifying "THUMB".

In some examples, entire words are also identified by the gesture text input recognition component 410 based on hand classifiers indicated by the hand classifier probability data 428. In some examples, a command, such as command corresponding to a specified set of keystrokes in an input system having a keyboard, is identified by the gesture text input recognition component 410 based on hand classifiers indicated by the hand classifier probability data 428.

In some examples, the gesture text input recognition component 410 determines symbol events included in the symbol input event data 414 on a basis of categorizing the hand classifier probability data 428 using artificial intelligence methodologies and one or more symbol models previously generated using machine learning methodologies. In some examples, a symbol model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

In some examples, the gesture text input recognition component 410 determines symbol events of the symbol input event data 414 on the basis of parsing the hand classifier probability data 428 using a previously determined symbol grammar.

The gesture inference component 408 and the gesture text input recognition component 410 communicate the gesture input event data 464 and symbol input event data 414, respectively, to a system framework component 416. The system framework component 416 receives the gesture input event data 464 and the symbol input event data 414 (collectively and separately "input event data") and generates undirected input event data 454 or directed gesture input event data 456 based in part on a class of the input event data. Undirected input events belonging to an undirected class of input events are routed to operating system level components, such as a system user interface component 418. Directed input events belonging to a directed class of input events are routed to a target component such as an AR gesture application component 420.

In an example of processing input event data received from the gesture inference component 408 and the gesture text input recognition component 410, the system framework component 416 classifies the input event data as undirected input event data 454 based on the input event data and component registration data described below.

The system framework component 416 receives the input event data and determines a target AR application component based on a user's indication or selection of a virtual object associated with the target AR application component while making a gesture corresponding to the input event data. In an example, the system framework component 416 determines a location in the real-world scene environment of the user's hand while making the gesture. The system framework component 416 determines a set of virtual objects that are currently being provided by the AR system to the user in an AR experience. The system framework component 416 determines a virtual object whose apparent location in the real-world scene environment correlates to the location in the real-world scene environment of the user's hand while making the gesture. The system framework component 416 determines the target AR application component on a basis of looking up, in internal data structures of the AR system, an AR application component to which the virtual object is associated and determines that AR application component as the target AR application component.

The system framework component 416 registers the target AR application component to which the directed gesture input event data 456 is to be routed by storing component registration data, such as component registration data 444 of FIG. 4B, in a datastore do be accessed during operation of the system framework component 416. The component registration data 444 includes a component ID field 436 identifying a target AR application component, a registered language field 442 identifying a language model to be associated with the target AR application component, and one or more registered gesture fields 438 and/or registered symbols fields 440 indicating gestures and symbols that are to be routed to the registered AR application component. As illustrated, the component ID field 436 includes an AR application component identification "TEXT ENTRY"; the registered language field 442 identifies a language associated with the registered AR application component, namely "ENGLISH"; the registered gesture field 438 includes a gesture identification, namely "LEFT_PALMAR_FINGERS EXTENDED_RIGHT PALMAR_FINGERS_EXTENDED", that is routed to the registered target AR application component, and registered symbols field 440 identifying a set of symbols, namely "[*]" signifying all symbols, that are routed to the registered AR application component.

As another example of component registration data, component registration data 446 of FIG. 4C includes a component ID field 448 including an AR application component identification "EMAIL"; a registered language field 442 identifying a language associated with the registered AR application component, namely "ENGLISH", and registered symbol field 450 identifying a set of symbols, namely the word "EMAIL", that are routed to the registered AR application component.

Referring again to the system framework component 416 processing input event data received from the gesture inference component 408 and the gesture text input recognition component 410 the system framework component 416 classifies input event data received from the gesture inference component 408 and the gesture text input recognition component 410 as undirected input event data 454 or directed gesture input event data 456 based on the input event data and component registration data. In an example, when processing symbol input event data 414 included in the input event data, the system framework component 416 searches registered symbols fields of the component registration data, such as registered symbols field 440 of component registration data 444, for registered symbols that match the symbol input event data. When the system framework component 416 determines a match, the system framework component 416 determines that the symbol input event data is directed gesture input event data 456. The system framework component 416 also determines a target AR application component based on a target AR application component identified in a component ID field, such as component ID field 436, of the component registration data including the matched registered symbols.

In a similar manner, when processing gesture input event data 464 included in the input event data, the system framework component 416 searches the registered gesture fields of the component registration data, such as registered gesture field 438 of component registration data 444, for registered gestures that match the gesture input event data. When the system framework component 416 determines a match, the system framework component 416 determines that the gesture input event data is directed gesture input event data 456 and also determines a target AR application component to which the directed gesture input event data 456 is to be routed. In a case the system framework component 416 determines that the symbol input event data and/or the gesture input event data of the input event data are not found in the component registration data, the system framework component 416 determines that the input event data are to be classified as undirected input event data 454 and are to be routed to the system user interface component 418.

In another example of processing directed gesture input event data 456, an AR application component, such as the AR gesture application component 420, registers itself with the system framework component 416. To do so, the AR application component communicates component registration data, such as component registration data 444 of FIG. 4B, to the system framework component 416. The system framework component 416 receives the component registration data and stores the component registration data in a datastore for use in routing directed gesture input event data 456 to the AR application component.

In another example of processing directed gesture input event data 456, the AR system determines that the directed gesture input event data 456 is to be routed to an AR application component based on an implication. For example, if the AR system is executing a current AR application component in a single-application modal state, the current AR application component is implied as the AR application component to which the directed gesture input event data 456 is routed.

In some examples, the system framework component 416 communicates language model feedback data 424 to the hand classifier inference component 406, the gesture inference component 408, and the gesture text input recognition component 410 in order to improve the accuracy of the inferences made by the hand classifier inference component 406, the gesture inference component 408, and the gesture text input recognition component 410. For example, a language model for English may include a word dictionary used for a type-ahead or autocomplete function. Such a language model may also include grammar rules used to provide autocorrecting. When using language model feedback, the system framework component 416 generates the language model feedback data 424 based on user context data such as component registration data of the registered AR application components and data about hand classifiers composing the registered gestures and hand classifiers composing gestures associated with registered symbols. The component registration data includes information of expected gestures and symbols in the gesture input event data 464 and symbol input event data 414 routed to the AR application component as part of directed gesture input event data 456, as well as a language associated with the AR application component. In addition, the system framework component 416 includes information about compositions of specific gestures including hand classifiers that are associated with the gestures and symbols.

In another example of processing the hand classifier probability data 428, the gesture input event data 464, and the symbol input event data 414, the system framework component 416 communicates hints as part of the language model feedback data 424 to the hand classifier inference component 406, gesture inference component 408, and gesture text input recognition component 410. The system framework component 416 generates the hints based on a language model associated with an AR application component, such as by a language specified in the registered language field 452 in component registration data 446. The gesture text input recognition component 410 determines a probable next symbol N based on previous characters N−1, N−2, etc. and the language model. In an example, the system framework component 416 generates the hints based on a language model that is a hidden Markov model predicting what the next symbol N is based on one or more of the previous characters N−1, N−2, etc. In another example, the gesture text input recognition component 410 uses AI methodologies to generate the next symbol N based on a language model that is generated using machine learning methodologies. The system framework component 416 generates the hints based on the next symbol N. In an example, the system framework component 416 determines a next gesture associated with the next symbol N by mapping the next symbol N to a next gesture based on a lookup table associating symbols with gestures. The system framework component 416 decomposes the next gesture to a set of one or more next hand classifiers. The system framework component 416 communicates the next gesture to the gesture inference component 408 as part of language model feedback data 424 and communicates the set of next hand classifiers to the hand classifier inference component 406 as part of language model feedback data 424.

AR application components executed by the AR system, such as AR DMVO application component 422, system user interface component 418, and AR gesture application component 420, are consumers of the data generated by the hand-tracking input pipeline 434, such as coordinate transformation data 430, skeletal model data 432, gesture input event data 464, and symbol input event data 414. The AR system executes the AR DMVO application component 422 to provide a user interface to a user of the AR system utilizing direct manipulation of visual objects within a 2D or 3D user interface. The AR system executes the system user interface component 418 to provide a system-level user interface to the user of the AR system, such as a command console or the like, utilizing gestures as an input modality. The AR system executes the AR gesture application component 420 to provide a user interface to a user of the AR system, such as an AR experience, utilizing gestures as an input modality.

The system framework component 416, on a basis of classifying that the input event data as undirected input event data 454, routes the input event data as undirected input event data 454 to the system user interface component 418.

In some examples, components of the AR system that are hosted by the computer vision SoC 458, such as the camera component 402, skeletal model inference component 404, and gross hand position inference component 412, communicate using a shared-memory buffer. In addition, the skeletal model inference component 404 and gross hand position inference component 412 publish the skeletal model data 432 and the coordinate transformation data 430, respectively, on a shared-memory buffer that is accessible by components outside of the hand-tracking input pipeline 434 and hosted by an application SoC 460, such as the AR DMVO application component 422. As indicated by legend 462, communications between components of the multi-SoC hand-tracking platform 400 that via a shared-memory buffer are indicated by a relatively lighter line in the figures than communications between components of the multi-SoC hand-tracking platform 400 using Inter-Process Communication (IPC) method calls.

In some examples, components of the AR system that are hosted by the computer vision SoC 458, such as the hand classifier inference component 406, the gesture inference component 408, and the gesture text input recognition component 410, communicate data, such as the hand classifier probability data 428, the gesture input event data 464, and the symbol input event data 414, respectively, using IPC methodologies within the computer vision SoC 458 and to components of the AR system that are hosted by an application SoC 460. As indicated by legend 462, communications between components of the multi-SoC hand-tracking platform 400 that use IPC method calls are indicated by a relatively heaver line in the figures than communications between components of the multi-SoC hand-tracking platform 400 via a shared-memory buffer.

In some examples, components of the AR system that are hosted by an application SoC 460, such as the system framework component 416, the AR gesture application component 420, and the system user interface component 418, communicate data using IPC method calls with with other components hosted by the application SoC 460 and with components that are hosted by the computer vision SoC 458.

In some examples, the hand-tracking input pipeline 434 continuously generates and publishes the symbol input event data 414, the gesture input event data 464, the skeletal model data 432, and the coordinate transformation data 430 based on the real-world scene environment frame data 426 generated by the one or more cameras of the AR system.

Figure 5:
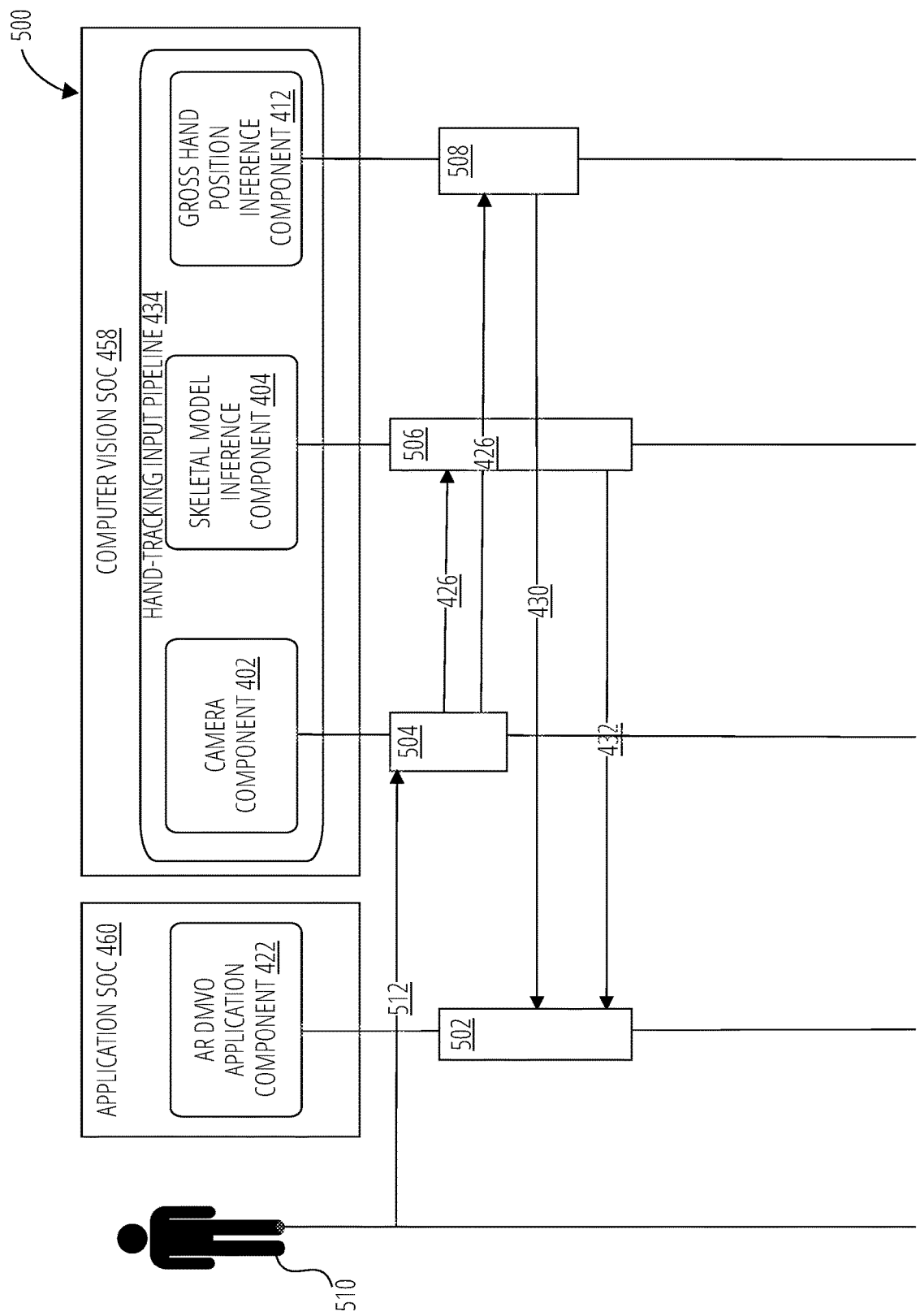
FIG. 5 is collaboration diagram of a hand-tracking input pipeline 434 of an AR system, such as glasses 100, in accordance with some examples.

FIG. 5 is a sequence diagram of an AR DMVO application process 500 of providing an AR DMVO application component 422 to a user 510 by an AR system in accordance with some examples. The AR DMVO application process 500 includes one or more processes executing independently on one or more SoCs of the AR system, such a computer vision SoC 458 and an application SoC 460. The AR system uses the AR DMVO application process 500 to a provide the AR DMVO application component 422 hosted by an application SoC 460 to the user 510 using a hand-tracking input pipeline 434 hosted by a computer vision SoC 458.

In process 502, the AR DMVO application component 422 generates a virtual user interface of the AR system and provides the virtual user interface to the user 510. The virtual user interface includes virtual objects that the user 510 virtually manipulates in order to interact with the AR DMVO application component 422.

While interacting the AR DMVO application component 422, the user 510 makes hand movements 512. In process 504, a camera component 402 of the hand-tracking input pipeline 434 captures the hand movements 512 and generates real-world scene environment frame data 426 using one or more cameras of the AR system, such as cameras 114 and 116 of FIG. 1. The camera component 402 communicates the real-world scene environment frame data 426 to a skeletal model inference component 404 of the hand-tracking input pipeline 434. In some examples, the camera component 402 communicates the real-world scene environment frame data 426 to the skeletal model inference component 404 using a shared memory buffer.

In process 506, the skeletal model inference component 404 receives the real-world scene environment frame data 426 from the camera component 402 and generates skeletal model data 432 based on the real-world scene environment frame data 426 as more fully described herein with reference to FIG. 4A, FIG. 4B, and FIG. 4C. The skeletal model inference component 404 communicates the skeletal model data 432 to the to the AR DMVO application component 422 hosted by the application SoC 460. In some examples, the skeletal model inference component 404 communicates the skeletal model data 432 to the AR DMVO application component 422 using a shared memory buffer that operates as a communication bridge between the application SoC 460 and the computer vision SoC 458.

In process 502, the AR DMVO application component 422 receives the skeletal model data 432 and uses the skeletal model data 432 to detect user interactions with the virtual user interface provided by the AR DMVO application component 422. For example, the AR DMVO application component 422 generates the virtual user interface including virtual objects. The virtual objects are associated with respective collider objects that the AR DMVO application component 422 can use to detect collisions between the virtual objects. The AR DMVO application component 422 generates one or more colliders associated with a hand of the user 510 based on the skeletal model data 432. As the user 510 makes hand movements, the AR DMVO application component 422 detects collisions between the colliders associated with the user's hand the colliders associated with the virtual objects of the virtual user interface.

The camera component 402 also communicates the real-world scene environment frame data 426 to a gross hand position inference component 412. The gross hand position inference component 412 generates coordinate transformation data 430 based on the real-world scene environment frame data 426 as more fully described herein with reference to FIG. 4A, FIG. 4B, and FIG. 4C. The gross hand position inference component 412 communicates the coordinate transformation data 430 to the AR DMVO application component 422. In some examples, the gross hand position inference component 412 communicates the coordinate transformation data 430 to the AR DMVO application component 422 using a shared memory buffer that operates as the communication bridge between the application SoC 460 and the computer vision SoC 458.

In process 502, the AR DMVO application component 422 receives the coordinate transformation data 430 and uses the coordinate transformation data 430 to help detect user interactions with the virtual user interface provided by the AR DMVO application component 422. For example, the AR DMVO application component 422 generates the virtual user interface including the virtual objects. The virtual objects are associated with respective collider objects that the AR DMVO application component 422 can use to detect collisions between the virtual objects. The AR DMVO application component 422 generates one or more colliders associated with a hand of the user 510 based on the with the aid of the coordinate transformation data 430. As the user 510 makes hand movements, the AR DMVO application component 422 detects collisions between the colliders associated with the user's hand the colliders associated with the virtual objects of the virtual user interface.

Figure 6:
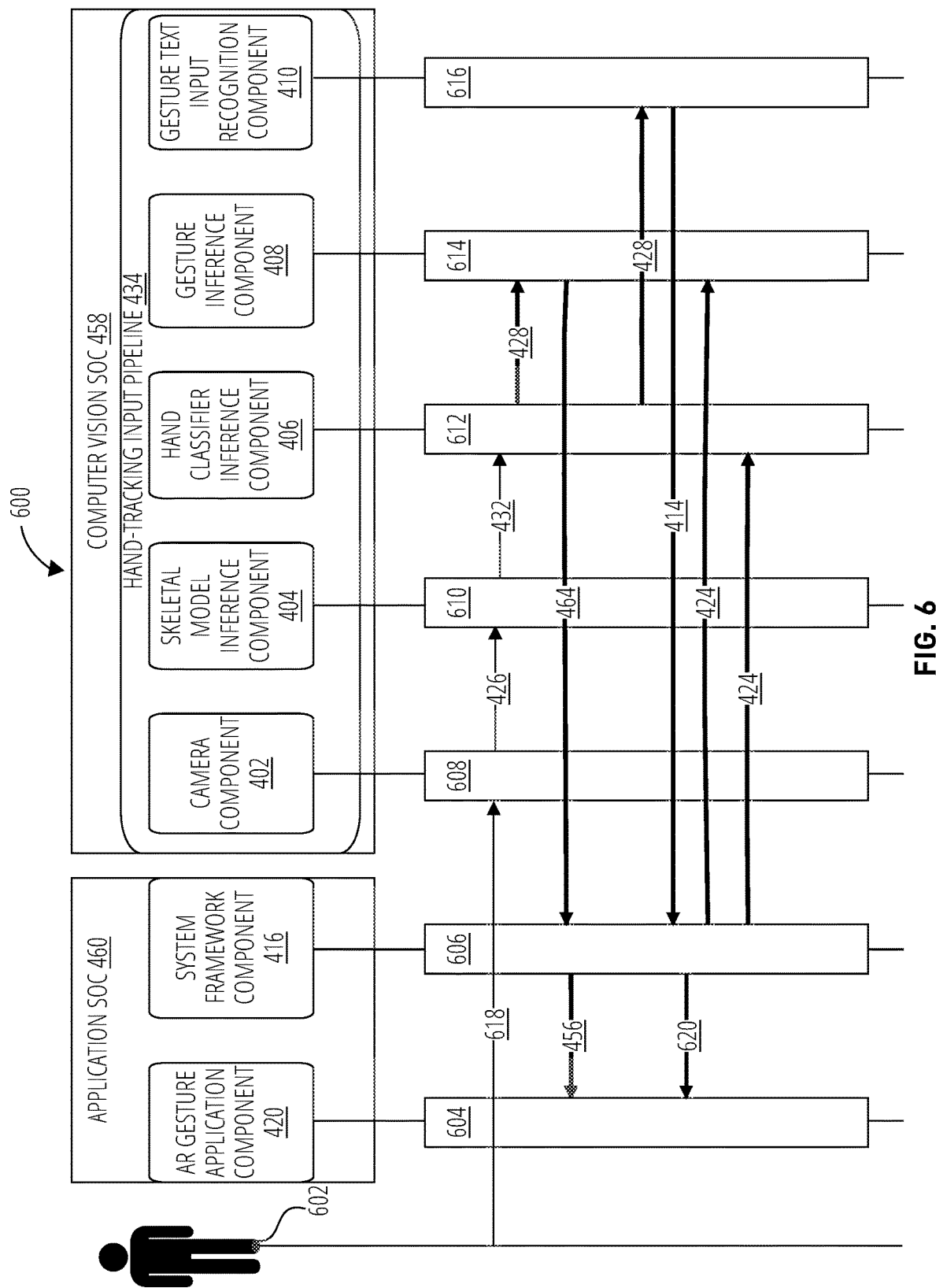
FIG. 6 is a sequence diagram of an AR gesture application process of providing an AR gesture application component to a user by an AR system in accordance with some examples.

FIG. 6 is a sequence diagram of an AR gesture application process 600 of providing an AR gesture application component 420 to a user 602 by an AR system in accordance with some examples. The AR gesture application process 600 includes one or more processes executing independently on one or more SoCs of the AR system. The AR system uses the AR gesture application process 600 to a provide the AR gesture application component 420 hosted by an application SoC 460 to the user 602 using a hand-tracking input pipeline 434 hosted by a computer vision SoC 458.

In process 604, the AR gesture application component 420 generates a user interface of the AR system and provides the user interface to the user 602. The user 602 uses hand motions or gestures as user inputs by the user 510 when interacting with the AR gesture application component 420.

While interacting with the AR gesture application component 420, the user 602 makes hand movements 618 that represent gestures intended by the user to be user inputs into the AR gesture application component 420. In process 608, a camera component 402 of the hand-tracking input pipeline 434 captures the hand movements 618 and generates real-world scene environment frame data 426 using one or more cameras of the AR system, such as cameras 114 and 116 of FIG. 1. The camera component 402 communicates the real-world scene environment frame data 426 to a skeletal model inference component 404 of the hand-tracking input pipeline 434. In some examples, the camera component 402 communicates the real-world scene environment frame data 426 to the skeletal model inference component 404 using a shared memory buffer.

In process 610, the skeletal model inference component 404 receives the real-world scene environment frame data 426 from the camera component 402 and generates skeletal model data 432 based on the real-world scene environment frame data 426 as more fully described herein with reference to FIG. 4A, FIG. 4B, and FIG. 4C. The skeletal model inference component 404 communicates the skeletal model data 432 to the to a hand classifier inference component 406 of the hand-tracking input pipeline 434. In some examples, the skeletal model inference component 404 communicates the skeletal model data 432 to the hand classifier inference component 406 using a shared memory buffer.

In process 612, the hand classifier inference component 406 receives the skeletal model data 432 from the skeletal model inference component 404 and generates hand classifier probability data 428 based on the skeletal model data 432 as more fully described herein with reference to FIG. 4A, FIG. 4B, and FIG. 4C. The hand classifier inference component 406 communicates the hand classifier probability data 428 to a gesture inference component 408 and a gesture text input recognition component 410. In some examples, the hand classifier inference component 406 communicates the hand classifier probability data 428 to other components of the AR system using an IPC protocol.

In process 614, the gesture inference component 408 receives the hand classifier probability data 428 and determines gesture input event data 464 based on the hand classifier probability data 428 as more fully described herein with reference to FIG. 4A, FIG. 4B, and FIG. 4C. The gesture inference component 408 communicates the gesture input event data 464 to a system framework component 416 hosted by the application SoC 460. In some examples, the gesture inference component 408 communicates the gesture input event data 464 to other components of the AR system using an IPC protocol creating a communications bridge between the computer vision SoC 458 and the application SoC 460.

In process 606, the system framework component 416 receives the gesture input event data 464 and generates directed gesture input event data 456 based in part on the gesture input event data 464 as more fully described herein with reference to FIG. 4A, FIG. 4B, and FIG. 4C. The system framework component 416 communicates the directed gesture input event data 456 to the AR gesture application component 420. In some examples, the system framework component 416 communicates the directed gesture input event data 456 to other components of the AR system using an IPC protocol.

In process 604, the AR gesture application component 420 receives the directed gesture input event data 456 and uses the directed gesture input event data 456 as user input. For example, the AR gesture application component 420 presents a user interface to the user that receives specific gestures made by the user 602 as user inputs. The user makes a specified gesture and the hand-tracking input pipeline 434 recognizes the specified gesture and the system framework component 416 routes those specific gestures to the AR gesture application component 420 as described herein with reference to FIG. 4A, FIG. 4B, and FIG. 4C. The AR gesture application component 420 receives and utilizes the directed gesture input event data 456 as user input data into a user interface being provided by the AR gesture application component 420.

In process 616, the gesture text input recognition component 410 receives the hand classifier probability data 428 and generates symbol input event data 414 based on the hand classifier probability data 428 as more fully described herein with reference to FIG. 4A, FIG. 4B, and FIG. 4C. The gesture text input recognition component 410 communicates the symbol input event data 414 to the system framework component 416 hosted by the application SoC 460. In some examples, the gesture text input recognition component 410 communicates the language model feedback data 424 to other components of the AR system using an IPC protocol.

In process 606, the system framework component 416 receives the symbol input event data 414 and generates directed symbol input event data 620 based in part on the symbol input event data 414 as more fully described herein with reference to FIG. 4A, FIG. 4B, and FIG. 4C. The system framework component 416 communicates the directed symbol input event data 620 to the AR gesture application component 420. In some examples, the system framework component 416 communicates the directed symbol input event data 620 to other components of the AR system using an IPC protocol.

In process 604, the AR gesture application component 420 receives the directed symbol input event data 620 and utilizes the directed symbol input event data 620 as user input data. For example, the AR gesture application component 420 presents a user interface to the user that allows the user 602 to enter text into a text object of an AR experience. The user 602 makes fingerspelling signs with their hands as part of hand movements 618 and the hand-tracking input pipeline 434 recognizes the fingerspelling signs as text symbols that are used as user input data.

In some examples, in process 606, the system framework component 416 generates language model feedback data 424 as more fully described herein with reference to FIG. 4A, FIG. 4B, and FIG. 4C. The system framework component 416 communicates the language model feedback data 424 to the hand classifier inference component 406 and the gesture inference component 408. In process 614, the gesture inference component 408 receives the language model feedback data 424 and uses the language model feedback data 424 to improve an accuracy of the generation of the gesture input event data 464 as more fully described herein with reference to FIG. 4A, FIG. 4B, and FIG. 4C. In process 616, the gesture text input recognition component 410 receives the language model feedback data 424 and uses the language model feedback data 424 to improve the accuracy of the generation of the symbol input event data 414 as more fully described herein with reference to FIG. 4A, FIG. 4B, and FIG. 4C.

Figure 7:
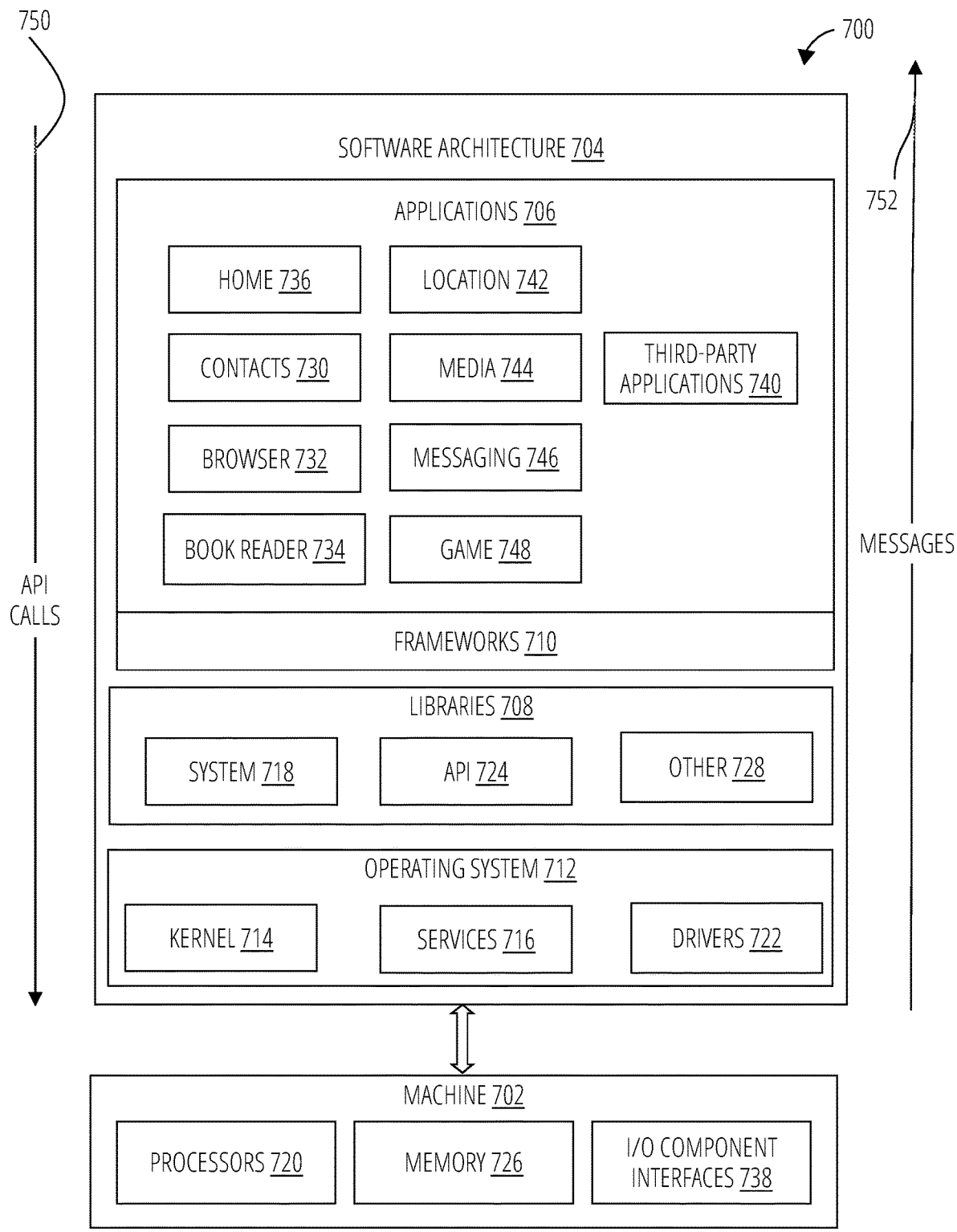
FIG. 7 is a block diagram showing a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a machine 702 that includes processors 720, memory 726, and I/O component interfaces 738. In this example, the software architecture 704 can be conceptualized as a stack of layers, where individual layers provide a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
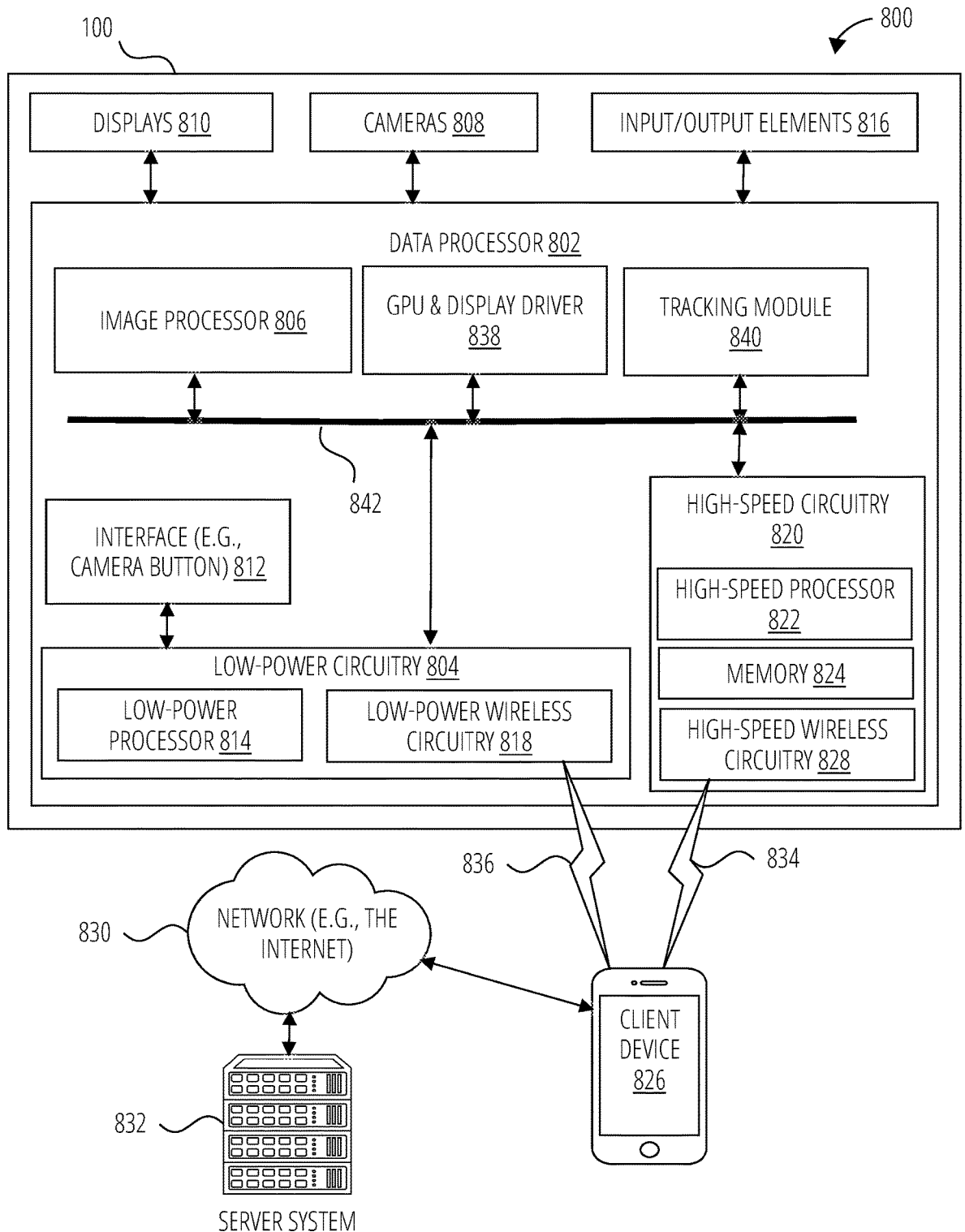
FIG. 8 is a block diagram illustrating a networked system including details of a head-worn AR system, in accordance with some examples.

FIG. 8 is a block diagram illustrating a networked system 800 including details of the glasses 100, in accordance with some examples. The networked system 800 includes the glasses 100, a client device 826, and a server system 832. The client device 826 may be a smartphone, tablet, phablet, laptop computer, access point, or any other such device capable of connecting with the glasses 100 using a low-power wireless connection 836 and/or a high-speed wireless connection 834. The client device 826 is connected to the server system 832 via the network 830. The network 830 may include any combination of wired and wireless connections. The server system 832 may be one or more computing devices as part of a service or network computing system. The client device 826 and any elements of the server system 832 and network 830 may be implemented using details of the software architecture 704 or the machine 300 described in FIG. 7 and FIG. 3 respectively.

The glasses 100 include a data processor 802, displays 810, one or more cameras 808, and additional input/output elements 816. The input/output elements 816 may include microphones, audio speakers, biometric sensors, additional sensors, or additional display elements integrated with the data processor 802. Examples of the input/output elements 816 are discussed further with respect to FIG. 7 and FIG. 3. For example, the input/output elements 816 may include any of I/O component interfaces 306 including output component interfaces 328, motion component interfaces 336, and so forth. Examples of the displays 810 are discussed in FIG. 2. In the particular examples described herein, the displays 810 include a display for the user's left and right eyes.

The data processor 802 includes an image processor 806 (e.g., a video processor), a GPU & display driver 838, a tracking module 840, an interface 812, low-power circuitry 804, and high-speed circuitry 820. The components of the data processor 802 are interconnected by a bus 842.

The interface 812 refers to any source of a user command that is provided to the data processor 802. In one or more examples, the interface 812 is a physical button that, when depressed, sends a user input signal from the interface 812 to a low-power processor 814. A depression of such button followed by an immediate release may be processed by the low-power processor 814 as a request to capture a single image, or vice versa. A depression of such a button for a first period of time may be processed by the low-power processor 814 as a request to capture video data while the button is depressed, and to cease video capture when the button is released, with the video captured while the button was depressed stored as a single video file. Alternatively, depression of a button for an extended period of time may capture a still image. In some examples, the interface 812 may be any mechanical switch or physical interface capable of accepting user inputs associated with a request for data from the cameras 808. In other examples, the interface 812 may have a software component, or may be associated with a command received wirelessly from another source, such as from the client device 826.

The image processor 806 includes circuitry to receive signals from the cameras 808 and process those signals from the cameras 808 into a format suitable for storage in the memory 824 or for transmission to the client device 826. In one or more examples, the image processor 806 (e.g., video processor) comprises a microprocessor integrated circuit (IC) customized for processing sensor data from the cameras 808, along with volatile memory used by the microprocessor in operation.

The low-power circuitry 804 includes the low-power processor 814 and the low-power wireless circuitry 818. These elements of the low-power circuitry 804 may be implemented as separate elements or may be implemented on a single IC as part of a system on a single chip. The low-power processor 814 includes logic for managing the other elements of the glasses 100. As described above, for example, the low-power processor 814 may accept user input signals from the interface 812. The low-power processor 814 may also be configured to receive input signals or instruction communications from the client device 826 via the low-power wireless connection 836. The low-power wireless circuitry 818 includes circuit elements for implementing a low-power wireless communication system. Bluetooth™ Smart, also known as Bluetooth™ low energy, is one standard implementation of a low power wireless communication system that may be used to implement the low-power wireless circuitry 818. In other examples, other low power communication systems may be used.

The high-speed circuitry 820 includes a high-speed processor 822, a memory 824, and a high-speed wireless circuitry 828. The high-speed processor 822 may be any processor capable of managing high-speed communications and operation of any general computing system used for the data processor 802. The high-speed processor 822 includes processing resources used for managing high-speed data transfers on the high-speed wireless connection 834 using the high-speed wireless circuitry 828. In some examples, the high-speed processor 822 executes an operating system such as a LINUX operating system or other such operating system such as the operating system 712 of FIG. 7. In addition to any other responsibilities, the high-speed processor 822 executing a software architecture for the data processor 802 is used to manage data transfers with the high-speed wireless circuitry 828. In some examples, the high-speed wireless circuitry 828 is configured to implement Institute of Electrical and Electronic Engineers (IEEE) 802.11 communication standards, also referred to herein as Wi-Fi. In other examples, other high-speed communications standards may be implemented by the high-speed wireless circuitry 828.

The memory 824 includes any storage device capable of storing camera data generated by the cameras 808 and the image processor 806. While the memory 824 is shown as integrated with the high-speed circuitry 820, in other examples, the memory 824 may be an independent stand-alone element of the data processor 802. In some such examples, electrical routing lines may provide a connection through a chip that includes the high-speed processor 822 from image processor 806 or the low-power processor 814 to the memory 824. In other examples, the high-speed processor 822 may manage addressing of the memory 824 such that the low-power processor 814 will boot the high-speed processor 822 any time that a read or write operation involving the memory 824 is desired.

The tracking module 840 estimates a pose of the glasses 100. For example, the tracking module 840 uses image data and associated inertial data from the cameras 808 and the position component interfaces 340, as well as GPS data, to track a location and determine a pose of the glasses 100 relative to a frame of reference (e.g., real-world scene environment). The tracking module 840 continually gathers and uses updated sensor data describing movements of the glasses 100 to determine updated three-dimensional poses of the glasses 100 that indicate changes in the relative position and orientation relative to physical objects in the real-world scene environment. The tracking module 840 permits visual placement of virtual objects relative to physical objects by the glasses 100 within the field of view of the user via the displays 810.

The GPU & display driver 838 may use the pose of the glasses 100 to generate frames of virtual content or other content to be presented on the displays 810 when the glasses 100 are functioning in a traditional augmented reality mode. In this mode, the GPU & display driver 838 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 826, or on a remote server. For example, one or more functions or operations described herein may be performed by one of the applications 706 such as messaging application 746.

Figure 9:
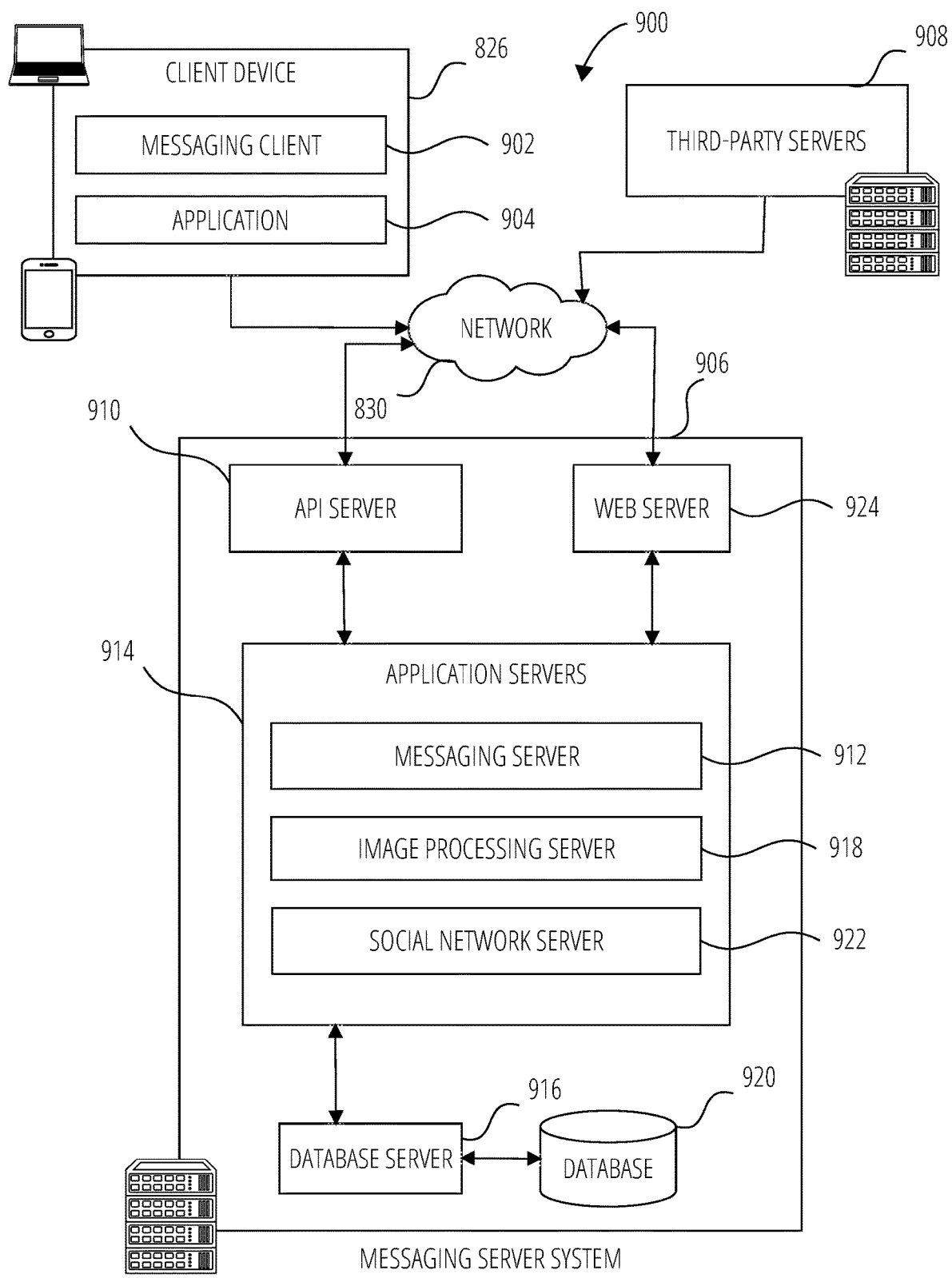
FIG. 9 is a block diagram showing an example messaging system for exchanging data (e.g., messages and associated content) over a network in accordance with some examples

FIG. 9 is a block diagram showing an example messaging system 900 for exchanging data (e.g., messages and associated content) over a network. The messaging system 900 includes multiple instances of a client device 826 which host a number of applications, including a messaging client 902 and other applications 904. A messaging client 902 is communicatively coupled to other instances of the messaging client 902 (e.g., hosted on respective other client devices 826), a messaging server system 906 and third-party servers 908 via a network 830 (e.g., the Internet). A messaging client 902 can also communicate with locally hosted applications 904 using Application Program Interfaces (APIs).

A messaging client 902 is able to communicate and exchange data with other messaging clients 902 and with the messaging server system 906 via the network 830. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 830 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a client device 826 has sufficient processing capacity.

The messaging server system 906 supports various services and operations that are provided to the messaging client 902. Such operations include transmitting data to, receiving data from, and processing data generated by the messaging client 902. This data may include message content, client device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914, and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the client device 826 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a client device 826, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the client device 826, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media,"

"computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computing system comprising:
    a first System on Chip (SoC) comprising:
        first one or more processors; and
        a first memory storing first instructions that, when executed by the first one or more processors, cause the first SoC to perform operations of a hand-tracking input pipeline of an Augmented Reality (AR) system, the operations comprising:
            generating real-world scene environment frame data based on hand movements being made by a user of the AR system using a camera component of the hand-tracking input pipeline;
            generating gesture input event data based on the real-world scene environment frame data and language model feedback data received from a component of the AR system; and
            communicating the gesture input event data to the component of the AR system; and
    a second SoC comprising:
        second one or more processors; and
        a second memory storing second instructions that, when executed by the second one or more processors, cause the second SoC to perform operations of the component of the AR system, the operations comprising:
            generating the language model feedback data based on context data of registered gestures;
            communicating the language model feedback data to the hand-tracking input pipeline;
            receiving the gesture input event data;
            classifying the gesture input event data as undirected or directed events based on component registration data of one or more application components of the AR system; and
            routing the gesture input event data to an application component of the one or more application components based on the classifying of the gesture input data and the component registration data.

2. The computing system of claim 1, wherein the hand-tracking input pipeline and the component of the AR system communicate via an Inter-Process Communication (IPC) protocol.

3. The computing system of claim 1, wherein the first instructions that, when executed by the first one or more processors, cause the first SoC to perform operations of the hand-tracking input pipeline, further cause the first SoC to perform operations comprising:
    generating skeletal model data based on the real-world scene environment frame data.

4. The computing system of claim 3, wherein the first instructions that, when executed by the first one or more processors, cause the first SoC to perform operations of the hand-tracking input pipeline, further cause the first SoC to perform operations comprising:
    generating hand classifier probability data based on the skeletal model data.

5. The computing system of claim 4, wherein the first instructions that, when executed by the first one or more processors, cause the first SoC to perform operations of the hand-tracking input pipeline, further cause the first SoC to perform operations comprising:
    generating the gesture input event data based on the hand classifier probability data.

6. The computing system of claim 1, wherein the first instructions that, when executed by the first one or more processors, further cause the first SoC to perform operations comprising:
    generating coordinate transformation data based on the real-world scene environment frame data.

7. The computing system of claim 1, wherein the AR system comprises a head-worn device.

8. A computer-implemented method, comprising:
    generating, by first one or more processors of a first System on Chip (SoC), real-world scene environment frame data based on hand movements being made by a user of an Augmented Reality (AR) system using a camera component of a hand-tracking input pipeline of the AR system;
    generating, by the hand-tracking input pipeline of the AR system using the first one or more processors, gesture input event data based on the real-world scene environment frame data and language model feedback data received from a component of the AR system;
    communicating, by the hand-tracking input pipeline of the AR system using the first one or more processors, the gesture input event data to the component of the AR system;
    generating, by the component using second one or more processors of a second SoC, the language model feedback data based on context data of registered gestures;
    communicating, by the component using second one or more processors, the language model feedback data to the first SoC;
    receiving, by the component using second one or more processors of a second SoC, the gesture input event data;

classifying, by the component using second one or more processors of a second SoC, the gesture input event data as undirected or directed events based on component registration data of one or more application components of the AR system; and routing, by the component using second one or more processors of a second SoC, the gesture input event data to an application component of the one or more application components based on the classifying of the gesture input data and the component registration data.

9. The computer-implemented method of claim 8, wherein the hand-tracking input pipeline and the component communicate via an Inter-Process Communication (IPC) protocol.

10. The computer-implemented method of claim 8, further comprising:

generating, by the hand-tracking input pipeline of the AR system using the first one or more processors, skeletal model data based on the real-world scene environment frame data.

11. The computer-implemented method of claim 10, further comprising:

generating, by the hand-tracking input pipeline of the AR system using the first one or more processors, hand classifier probability data based on the skeletal model data.

12. The computer-implemented method of claim 11, further comprising:

generating, by the hand-tracking input pipeline of the AR system using the first one or more processors, the gesture input event data based on the hand classifier probability data.

13. The computer-implemented method of claim 8, further comprising:

generating, by the hand-tracking input pipeline of the AR system using the first one or more processors, coordinate transformation data based on the real-world scene environment frame data.

14. The computer-implemented method of claim 8, wherein the AR system comprises a head-worn device.

15. A non-transitory computer-readable storage medium, the computer-readable storage medium comprising:

first instructions for a first System on Chip (SoC) that, when executed by the first SoC, cause the first SoC to perform first operations of a hand-tracking input pipeline of an Augmented Reality (AR) system, the first operations including:

generating real-world scene environment frame data based on hand movements being made by a user of the AR system using a camera component of the hand-tracking input pipeline;

generating gesture input event data based on the real-world scene environment frame data and language model feedback data received from a component of the AR system; and communicating the gesture input event data to the component of the AR system; and second instructions for a second SoC that, when executed by the second SoC, cause the second SoC to perform second operations of the component of the AR system, the second operations including:

generating the language model feedback data based on context data of registered gestures;

communicating the language model feedback data to the hand-tracking input pipeline;

receiving the gesture input event data;

classifying the gesture input event data as undirected or directed events based on component registration data of one or more application components of the AR system; and routing the gesture input event data to an application component of the one or more application components based on the classifying of the gesture input data and the component registration data.

16. The non-transitory computer-readable storage medium of claim 15, wherein the first operations further comprise:

communicating the gesture input event data to the component via an Inter-Process Communication (IPC) protocol.

17. The non-transitory computer-readable storage medium of claim 15, wherein the first operations further comprise:

generating skeletal model data based on the real-world scene environment frame data.

18. The non-transitory computer-readable storage medium of claim 17, wherein the first operations further comprise:

generating hand classifier probability data based on the skeletal model data.

19. The non-transitory computer-readable storage medium of claim 18, wherein the first operations further comprise:

generating the gesture input event data based on the hand classifier probability data.

20. The non-transitory computer-readable storage medium of claim 15, wherein the first operations further comprise:

generating coordinate transformation data based on the real-world scene environment frame data.

21. The non-transitory computer-readable storage medium of claim 15, wherein the AR system comprises a head-worn device.

* * * * *